United States Patent [19]
Crow, Jr. et al.

[11] Patent Number: 5,186,159
[45] Date of Patent: Feb. 16, 1993

[54] BARBECUE GRILL ASSEMBLY

[75] Inventors: Harvey L. Crow, Jr.; Charles W. Krosp, both of Paragould, Ark.

[73] Assignee: Arkla Products Company, Paragould, Ark.

[21] Appl. No.: 783,782

[22] Filed: Oct. 29, 1991

[51] Int. Cl.⁵ .............................................. F24C 3/00
[52] U.S. Cl. ............................... 126/41 R; 126/41 D; 126/25 R
[58] Field of Search ................. 126/41 R, 25 R, 41 D; 99/340

[56] References Cited

U.S. PATENT DOCUMENTS

| | | | |
|---|---|---|---|
| 2,838,991 | 6/1958 | Kleinmann et al. | 99/421 |
| 3,802,413 | 4/1974 | Pepin | 126/41 R X |
| 4,245,505 | 1/1981 | Baynes | 126/41 R X |
| 4,337,751 | 7/1982 | Sampson et al. | 126/25 |
| 4,413,515 | 11/1983 | Quinn | 126/41 R X |
| 4,488,534 | 12/1984 | Koziol | 126/25 |
| 4,524,617 | 6/1985 | Krehel et al. | 126/41 R X |
| 4,561,418 | 12/1985 | Cairns | 99/340 X |
| 4,665,891 | 5/1987 | Nemec et al. | 126/25 |
| 4,718,399 | 1/1988 | Shepherd | 126/25 |
| 4,895,131 | 1/1990 | Overholser | 126/25 R X |
| 4,949,701 | 8/1990 | Krosp et al. | 126/41 |

OTHER PUBLICATIONS

Arklamatic Outdoor Gas Grill Assembly Instructions & Parts List, Dec. 1987.
Char-Broil Gas Grills GG 1218, W.C. Bradley Enterprises, Inc. Columbus, GA, dated prior to Jan. 1987.
Shepard, Form No. GBQ-022-1-85, Kermil Export Corp., Markham, Ontario, Canada, Jan. 1985.

*Primary Examiner*—Larry Jones
*Attorney, Agent, or Firm*—Whyte & Hirschboeck S.C.

[57] ABSTRACT

A gas-fired barbecue grill with an improved fuel gauge assembly, molded workshelf and a two-part grill head assembly including a stationary upper enclosure supported between upright stanchions and a lower enclosure drawer for supporting and retaining a burner unit.

12 Claims, 4 Drawing Sheets

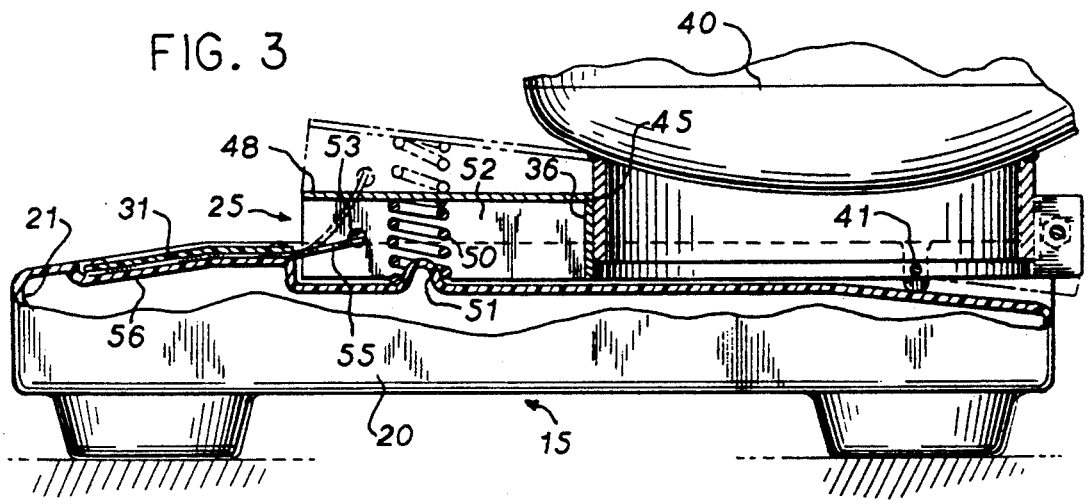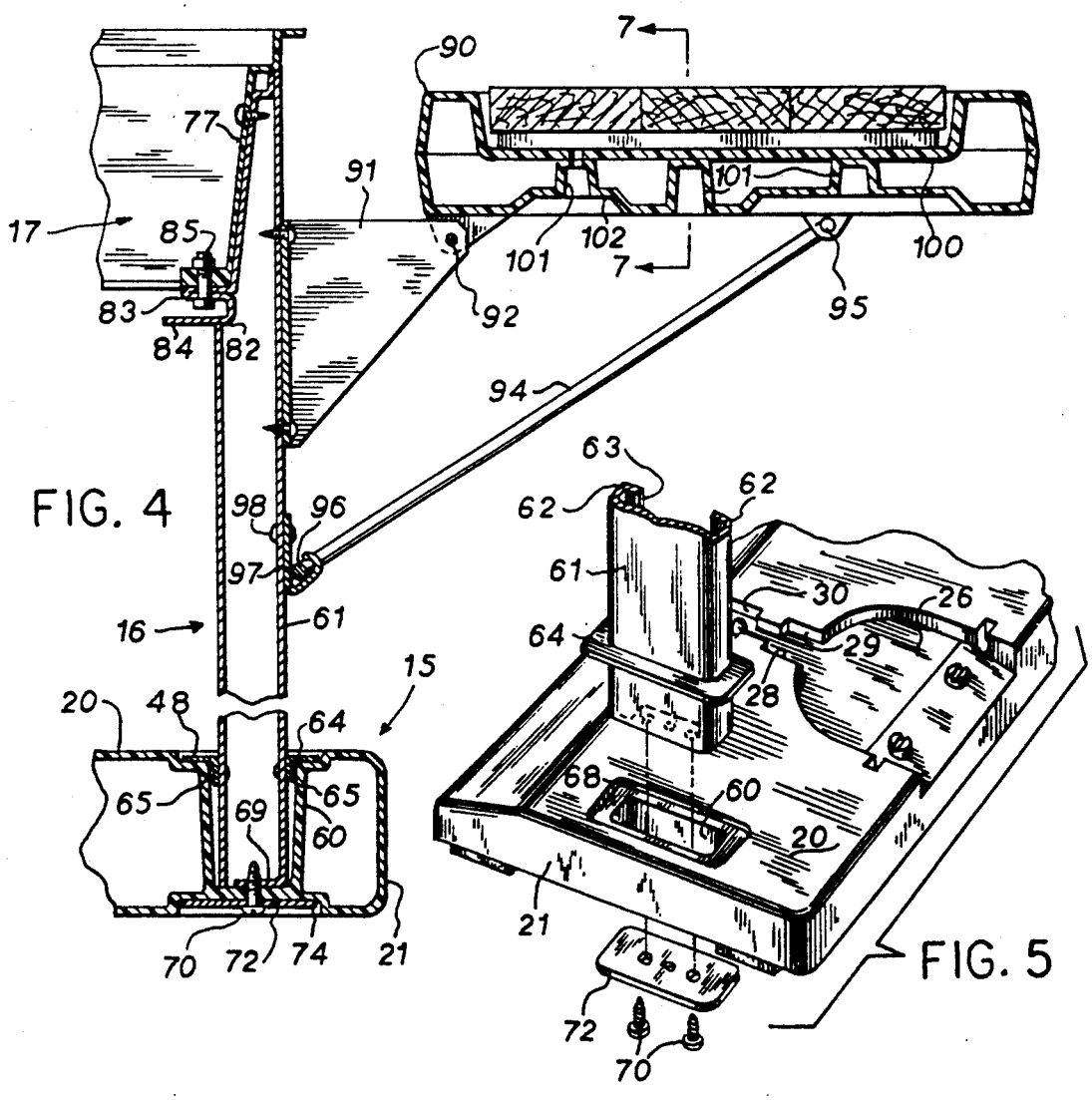

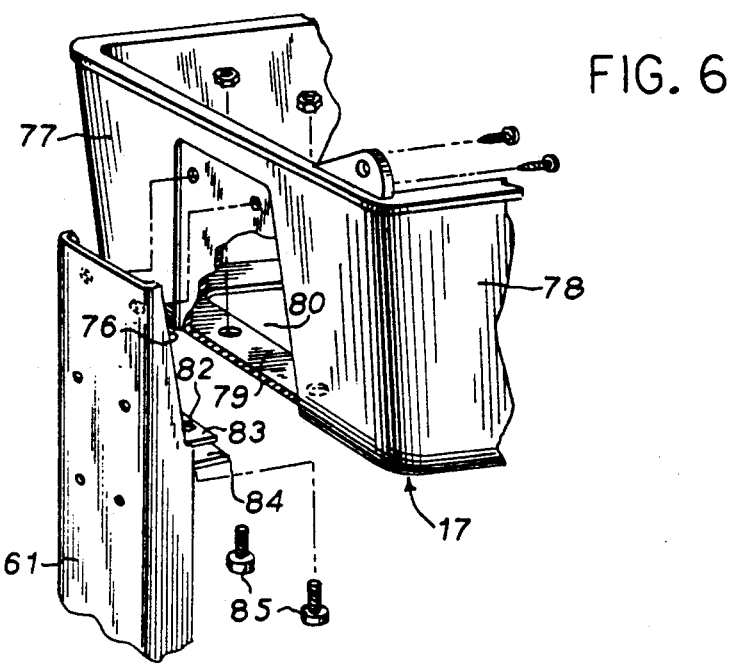
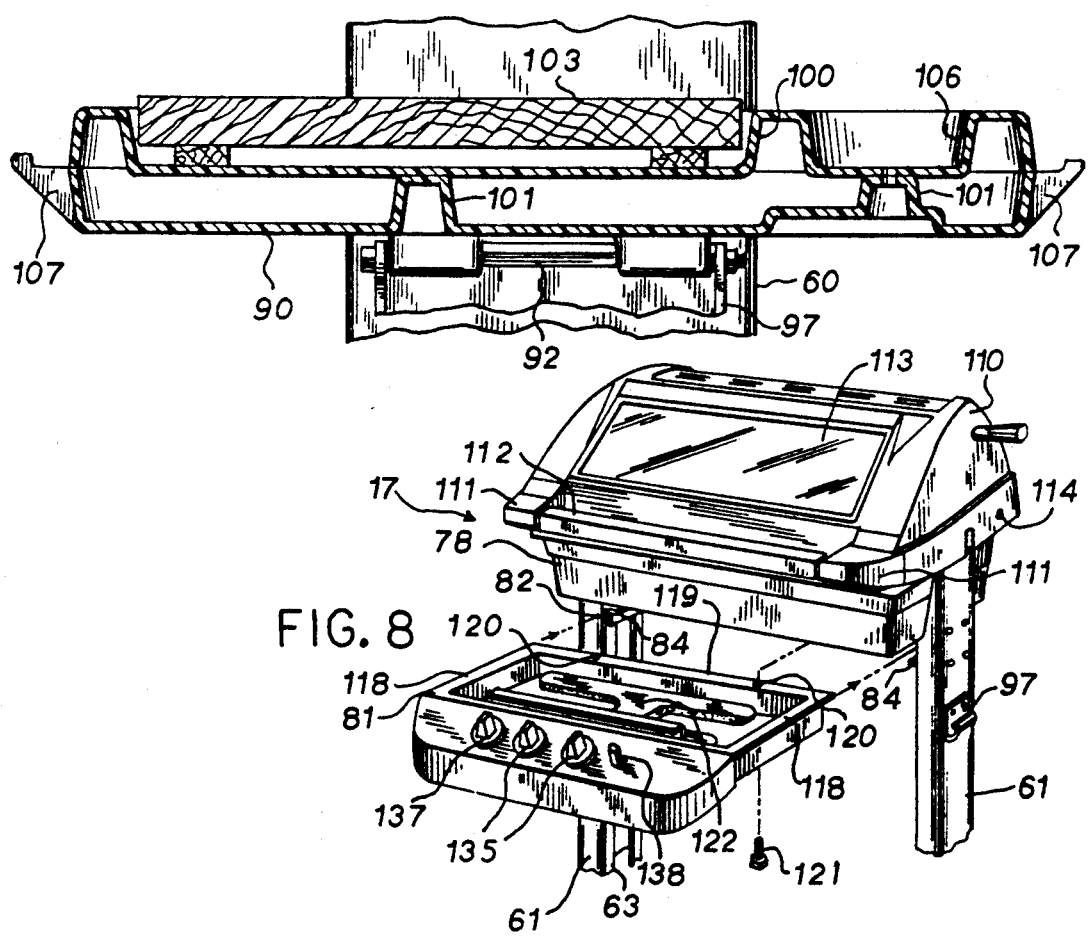

BARBECUE GRILL ASSEMBLY

BACKGROUND OF THE INVENTION

1. Field of Invention

This invention relates to a gas-fired barbecue grill with an improved fuel gauge assembly, molded workshelf including a retaining well for removably securing and supporting a separate utility board, an improved grill head assembly including a lower enclosure drawer for supporting and retaining a burner unit and an improved upright stanchion assembly for supporting the grill head assembly.

2. Description of the Prior Art

A brochure entitled "Assembly Instructions & Parts List" for outdoor gas grills, further identified as Stock No. 42681, dated December 1987, and published by the Assignee of this application, is representative of typical prior art grill head assemblies, as is the disclosure of U.S. Pat. No. 4,488,534 issued to Walter Koziol Dec. 18, 1984. A brochure entitled "Char-Broil Gas Grills" published by W. C. Bradley Enterprises Inc. of Columbus, Ga. (GG1218), prior to January 1987, is representative of typical prior art directed to a pedestal supported gas grill and to a typical fuel indicator disposed in-line with a liquid propane (LP) tank supplying fuel to the grill.

Each of the grill head assemblies of the aforementioned prior art brochures and patent illustrate a unitary closed-bottom container arranged for supporting and enclosing a burner assembly, a grate, heat distributing media, such as "lava rock" briquettes, and a food-supporting cooking grid. Further, a separate, conventional fuel level indicator is disclosed in the Bradley publication. A single pedestal support unit, of conventional type, is also illustrated in the Bradley brochure. Constructions of this nature require relatively complex supporting members requiring special fastening devices for both the top and bottom of the pedestal supports. They also are designed for special purpose mounting and do not permit alternative use as a relatively permanent installation, or as a support in conventional portable cart assemblies.

SUMMARY OF THE INVENTION

It is a primary object of the present invention to provide a gas-fired cooking grill including an improved grill head assembly, wherein the assembly container normally enclosing a suspended grid for supporting food to be cooked, a suspended grate for supporting heat distribution media and a burner assembly has been divided into separate enclosure members. An upper member provides an enclosure for the suspended grid and grate and includes an upper opening and a cover for the upper opening, and a lower opening defined by an inwardly extending marginal ledge. The lower opening communicates with the upper opening of a separate lower drawer-like enclosure which supports the burner assembly. The lower drawer-like unit is slidably supported relative to the upper enclosure unit to permit ease in access to the burner assembly for maintenance and cleaning operations.

It is a another object of this invention to provide an improved fuel gauge having an indicator positioned in an upper exposed surface of the supporting base member for the grill assembly. The gauge includes a lever pivotally supporting a liquid propane (LP) tank resting thereon, and with the lever being biased to balance the weight of the LP tank. Visual indication of the relative weight difference as fuel is consumed from the tank may be viewed from directly above the upper surface of the base member.

It is still another object of the present invention to provide an improved pedestal support member in the form of laterally spaced stanchions arranged at their respective lower ends to be seated in integrally formed, re-entrant, wells formed in the surface of the plastic molded base member. The stanchions are fastened to the base member and are supported thereon by threaded screws and stabilized by a surrounding flange seated on a recessed upper surface of its respective well. The said stanchions may also be arranged for support of said grill assembly independently of the base member, in backfilled and/or concrete containing ground holes, or the like, for permanent installation.

It is a further object of the present invention to provide a gas-fired grill assembly including a collapsable, laterally extending, molded workshelf having an integrally formed well for receiving a removable utility board, wherein the utility board may be removed for washing and cleaning apart from the assembly, and wherein integrally formed hook-like support members may be provided to project from the workshelf and are arranged to provide a stationary support for cooking utensils or the like.

BRIEF DESCRIPTION OF THE DRAWINGS

FIG. 3 is a fragmentary, sectional view taken along lines 3—3 of FIG. 2;

FIG. 4 is a sectional view taken approximately along lines 4—4 of FIG. 2, and including a major portion of the height of the assembly of FIG. 1;

FIG. 5 is a fragmentary perspective view, partially exploded to illustrate the mean of attaching of an upright stanchion to the base member;

FIG. 6 is a fragmentary perspective view, partially in section illustrating the upper end of a stanchion with means for supporting the upper enclosure of the grill head assembly and further illustrating the rail means for slidably supporting the lower drawer-like enclosure of the grill head assembly;

FIG. 7 is a fragmentary cross-sectional view taken along lines 7—7 of FIG. 4 to illustrate the relative positioning and formation of parts forming the improved workshelf and utility board of the present invention;

FIG. 8 is an exploded perspective view of the upper portion of the improved gas-fired grill assembly of the present invention and further illustrating the operation of the lower grill head enclosure to indicate the drawer-like slidable feature therein.

DESCRIPTION OF THE PREFERRED EMBODIMENT

The improved fuel gauge assembly will be described in connection with the views of FIGS. 1-3 and 5. These drawing figures further provide a basis for generally describing other important features of the grill assembly.

Figure 1:
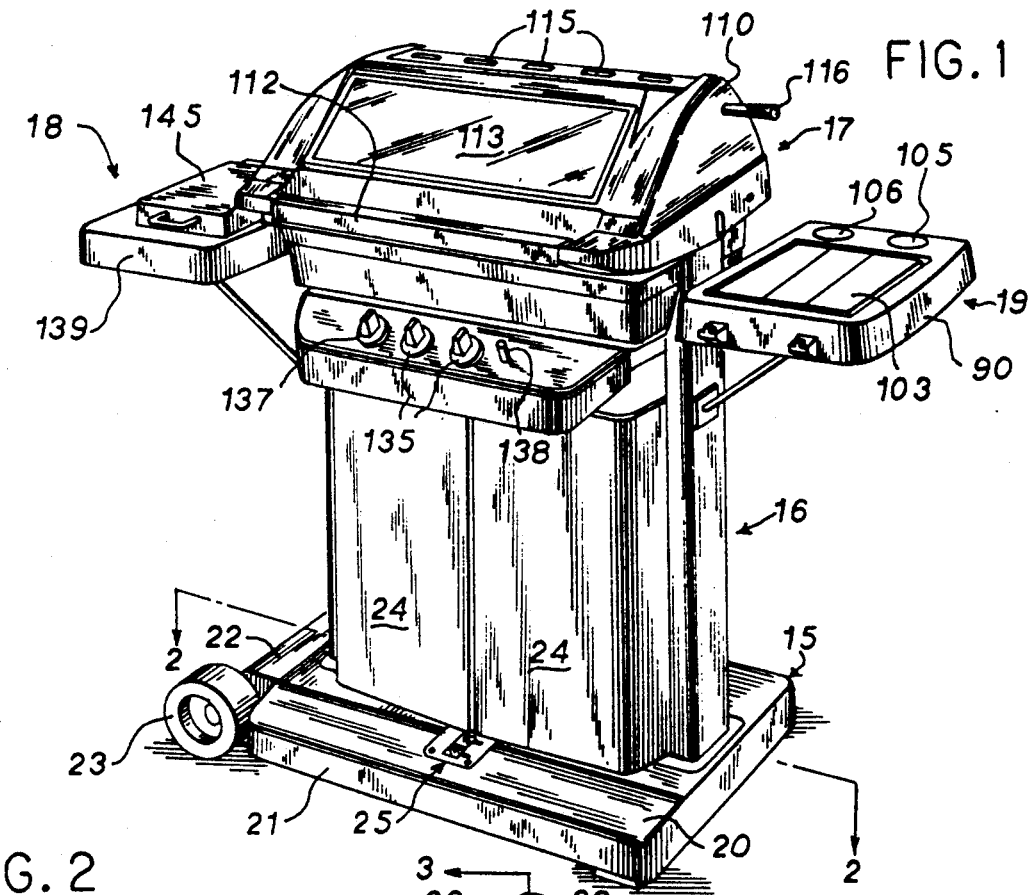
FIG. 1 is a perspective view of a pedestal supported gas-fired grill assembly made in accordance with the present invention.

The general assembly of the gas-fired cooking grill is shown in the perspective view of FIG. 1. It will be noted that the assembly preferably comprises a supporting base member 15, a pedestal assembly 16 and a grill head assembly 17 and, in the present embodiment, a laterally projecting secondary or side burner assembly 18 and a laterally projecting workshelf assembly 19, details of each generally indicated component to be hereinafter explained.

Figure 2:
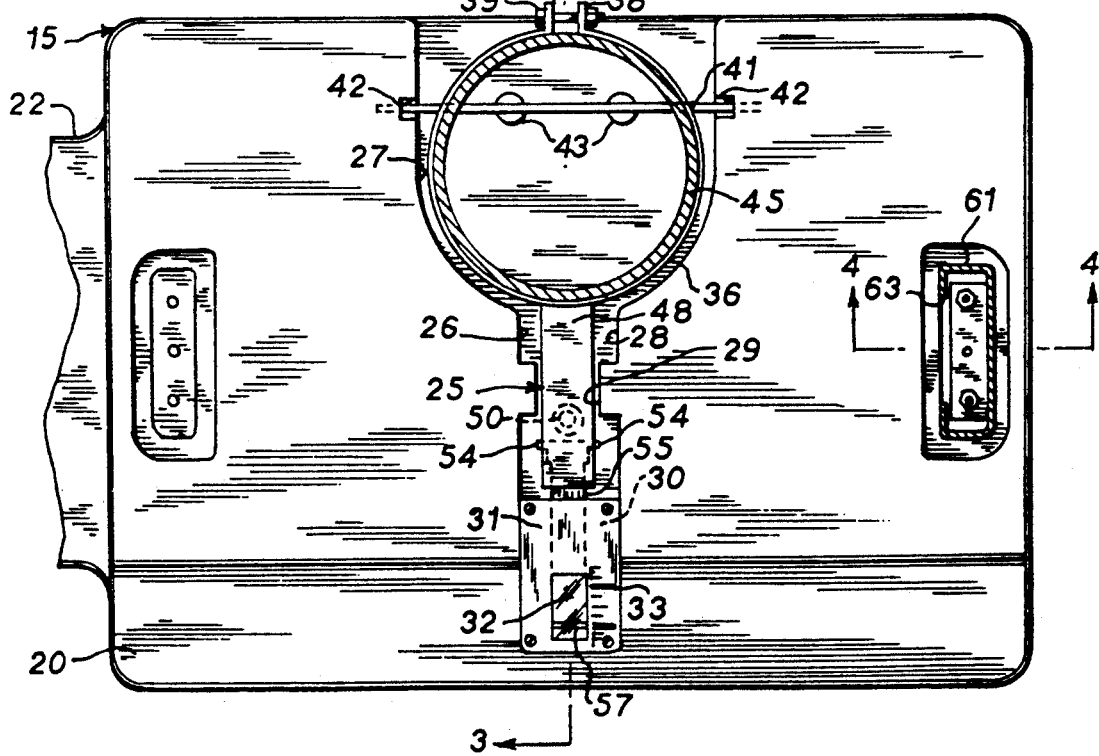
FIG. 2 is a fragmentary, cross-sectional view with enclosure panels removed, and taken along lines 2—2 of FIG.

The base member 15, as detailed in the views of FIGS. 2, 3 and 5, is preferably formed as a simple hollow molding 20 strengthened by continuous, marginal sidewall 21. The molding 20 further includes an integrally formed extension 22 of reduced cross section arranged to receive the axle (not shown) for supporting oppositely disposed, molded wheels 23 to assist in transporting the grill assembly to a desired cooking or storing location. Enclosing modesty panels 24 are provided for decorative, as well as protective, purposes and are fastened (not shown) together and to stanchions of the supporting pedestal assembly 16.

Fuel Gauge Assembly

With particular reference to FIGS. 2, 3 and 5, it will be observed that the improved fuel gauge assembly is a built-in feature of the improved grill and is denoted generally by the reference 25. The assembly 25 is disposed and supported within the confines of an elongated well or trough 26. The trough 26 includes a relatively enlarged rear portion 27, a reduced channel portion 28, and an intermediate guiding retainer portion 29. The forward or distal end portion 30 of the well 26 extending outwardly of the panels 24 is covered with a plastic molded plate or cover 31 having a transparent area 32. The plate 31 includes indicia 33 imprinted thereon, and wherein the letter "E" indicates "empty" and "F" is indicative of a full LP tank. It will be observed from the views of FIGS. 2 and 3 that the fuel gauge assembly 25 comprises a sheet metal member including a clamping ring 36. The ring 36 is open at one end and provides outwardly bent, apertured ears 38 arranged to receive a conventional nut and bolt assembly 39. The ring 36, in addition to retention or support of an LP fuel tank 40, acts as a lever member supported by a pivot pin 41 retained at appropriate ends by opposed trunion areas 42 integrally formed at in opposite sides of the rear portion 27 of the trough 26. The trunions each include an aperture for receiving the pin 41. Additional centra support of the pin is provided by embossments 43 also integrally formed in the base 20.

It will be observed that a clamping ring 36 is preferably formed to receive the annular base 45 welded to the lower surface of the LP tank 40. A nut and bolt assembly 39 permits secured retention of the clamping ring 45 to the tank 40.

The opposite end of the clamping ring 36, is welded, or otherwise secured, to a laterally projecting, elongated tongue portion 48 loosely seated in the channel 28 of the trough 26 and relatively loosely retained from sideways motion by the restricted guide portion 29 of the well to permitting rotational motion in either direction relative to the supporting pivot pin 41 (see FIG. 3). The tongue portion 48 provides a lever movement arm, and movement thereof is dependent upon the relative weight or content of the amount of fuel contained in the tank 40. The solid lines of the tongue portion 48, as shown in FIG. 3, indicate the position of the tongue portion 48 when a full LP tank 40 is seated in the ring 36. A compression coil spring 50 is supported at its lower end by an embossment 51 formed in the floor of the trough 26 and biases the tongue portion 48 and ring 36 clockwise about the pivot pin 41 with respect to FIG. 3. The phantom lines of FIG. 3 defining the tongue portion 48, are indicative of the position of the tongue portion 48 when the tank 40 has been emptied.

The tongue portion 48 is further formed to include depending sidewalls 52 each apertured at 53 to receive ear portions 54 extending laterally from the inner end of a flexible indicator member 55. The elongated indicator member 55 is preferably formed from a thin plastic sheet and is s idably received between the cover 31 and the floor portion 56 of the distal end of the well 26. The slidable indicator 55 is provided with a horizontal marker or indicia 57 which acts to indicate the relative position of the indicator 55 when compared to the stationery indicia 33 imprinted on the cover plate 31.

Thus, it will be apparent that the fuel gauge assembly provides a convenient means of indicating the weight of fuel remaining in the tank 40. The novel fuel gauge assembly is well protected from the elements and from contact with possible interfering objects during transporting movement or operation of the grill assembly. It is also readily visible from above. There are no appendages or other means for interfering with a true indication of the fuel supply, and the indicator is protected by means of the cover plate 31.

Pedestal Support Assembly

The improved supporting structure comprising pedestal assembly 16 will next be described with particular attention to the views of FIGS. 4, 5 and 6. The base member 15, as mentioned earlier, is preferably formed from a plastic molding 20 to include a substantially continuous, marginal sidewall 21 (see FIG. 4). The molding 20 provides spacedapart, integrally formed stanchion support wells 60. Upright stanchions 61 is are preferably formed from a sheet metal stamping formed with sides folded over to define a longitudinal opening 63 substantially coextensive with its length. A continuous flange 64 is fastened to the outside wall of each stanchion 61 by means of rivets 65 securing the downturned portion of the flange 64 as shown in FIG. 4. The flange 64 is arranged to be seated in and rest upon a recessed surface 68 defining the upper marginal surface of the well 60. The lower end of the hollow stanchion 61 is preferably in-turned at 69 and apertured to receive threaded sheet metal screws 70. The headed sheet metal screws 70 directly engage a reinforcing plate 72 adapted for seating within a bottom recessed surface 74 of the base member 15 to provide additional stabilizing means and further assist in securing upright stanchion 61 to the bottom wall of the well 60.

With attention being next directed to the upright stanchion 61, as shown in FIGS. 4 and 6, it will be noted that the stanchion 61 is formed at its upper distal end portion to provide an angular surface 76 for accommodating a conventionally downwardly tapered endwall 77 of the upper enclosure 78 forming part of the grill head assembly 17, which will hereinafter be described.

The enclosing walls of the upper enclosure 78, including the endwall 77, are preferably cast of aluminum to form an inwardly extending, bottom marginal surface portion 79 defining an enlarged opening 80 in the bottom of the upper enclosure member 78. The function of each of the elements 77, 78 and 79 will be hereinafter explained. For present purposes, the upper supporting arrangement, including the upright stanchion 61, comprise an inwardly extending channel shaped slide member 82 welded, or otherwise fastened to the upper end of the stanchion 16, and extending inwardly therefrom. It will be observed that the slide member 82 includes inwardly extending elongate, spaced apart upper and lower walls 83 and 84. The upper wall 83 is apertured to receive a conventional nut and bolt assembly 85, whereas the lower channel wall 84 extends inwardly relative to the upper channel wall 83 to act as a supporting drawer slide for the lower grill head enclosure as will be later described.

Workshelf Assembly

The improved workshelf assembly 19 will next be described with particular attention being drawn the views of FIGS. 1, 4 and 7. In the preferred embodiment, the workshelf assembly 19 comprises a plastic molded workshelf 90 extending laterally from one of the stanchions 61 and being supported thereon by means of a stationery hinge member 91 and its hinge pin 92. The workshelf 90 is shown in operating, relatively horizontal, position in FIG. 4, and is further supported in operating position by means of a U-shaped hanger 94. The hanger 94 is pivotally supported at inturned ends by means of a trunion 95 integrally molded in the bottom wall of the workshelf 90. The lower end of the hanger 94 includes a ball portion 96 arranged for releasable seating within a hook member 97 fastened to the outer wall of the stanchion 61 by means of rivets 98. Thus, the 10 workshelf 90 may be collapsed downwardly about the pivot 92 when not in use. The worksheet molding 90 is preferably hollow and includes an integral, centrally located well 100 having its bottom resting upon embossments 101 rising from the bottom 102 of the molded workshelf 90. The well 100 is arranged, as shown, to support a utility board 103, which is usually made of wood, and may provide a cutting or other surface for preparation of food. The board 103 is readily removable for washing, and the molded well surface may also be readily cleaned upon removal of the board 103. The workshelf 90 further preferably contains one or more smaller wells 105 and 106 for receiving condiment containers or drinking glasses (not shown). The workshelf 90 is also preferably provided with integrally molded hook-like extensions 107 for receiving utensils, towels or the like.

Improved Grill Head Assembly

The improved grill head assembly 17 will next be described with particular attention being directed to the views of FIGS. 8-10, inclusive.

Before describing the grill head assembly I7, attention is directed to FIG. 8 wherein the opposed stanchions 61 are shown free from modesty panels 24. It will be apparent that the stanchions may be mounted directly in concrete or otherwise back-filled holes in the ground if it is desired to have a permanent installation of the barbecue or cooking grill.

As previously described, the grill head assembly 17 is comprised of respective upper and lower enclosures 78 and 8I and a cover 110. The cover 110 is relatively conventional in that it is preferably made of an aluminum casting to which is attached a pair of plastic handle supports 111 and a wooden handle 112. A viewing area covered by tempered, heat withstanding glass 113 is also supplied. The opposite ends of the cover 110 are pivotally supported on the upper enclosure 78 by pivot pins 114. The cover 110 may also be vented by elongated apertures 115, opening and closing of which may be accomplished by a conventional shutter (not shown) having an outwardly extending, insulated operating handle 116.

As previously described in connection with FIG. 6, the stanchions 61 are each provided with a channel member 82, also which each include a lower wall or slide 84. The wall or slide 84 provides a stationery slide support arranged to slidably receive flanged side ledges 118 of the lower enclosure or drawer 81. The rear ledge 119 is apertured at 120 to receive threaded fasteners 121 for retention of the lower enclosure in cooking position, as shown in the views of FIGS. 9 and 10.

It will be observed that the lower enclosure supports a conventional dual "H" burner 122 The burner 122 is supplied with propane gas from venturi tubes 124 and is retained in place by means of S-shaped brackets 125 fastened to the enclosed bottom of the enclosure 81. The enclosure 81 is vented at 126. A conventional grate 128 is arranged to rest on the bottom ledge 79 encircling and defining the opening 80 of the upper open-bottom enclosure 78. The grate 128 supports heat distribution media 130, such as a conventional lava rock. A sheet metal control panel 132 is supported by and extends outwardly from the lower enclosure 81. The panel 132 is attached to the enclosure 81 by means of a plurality of rivets 133. A heat shield member 134 supported by and depends below the upper surface of the panel 132. Panel knobs 135 control the valves 136 supplying oppositely disposed sides of the H burner in a conventional manner. The third panel knob 137 controls the fuel supply to the element of a side burner assembly 139. A pilot igniter (not shown) is operated by manual depression of button 138. The valve 136 is attached to a flexible fuel supply line or hose 140, attached at its opposite end to the valve of the fuel tank 40 by means of a manifold arrangement (not shown).

Figure 9:
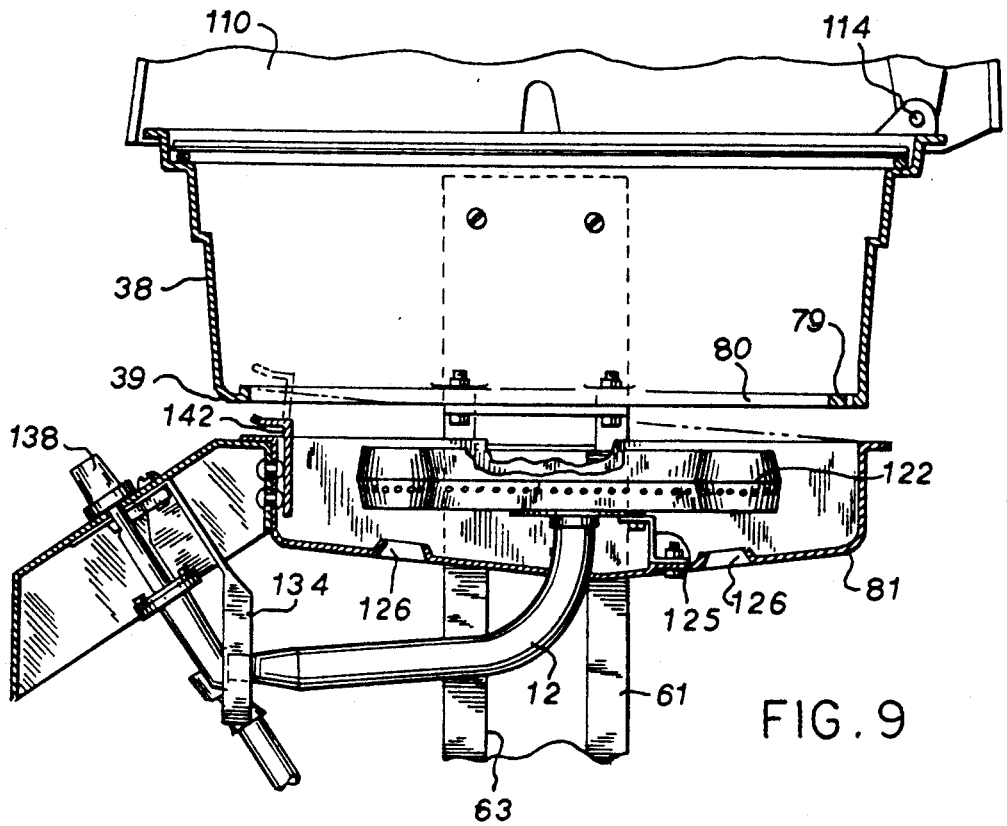
FIGS. 9 and 10 are fragmentary cross-sectional views of the grill head assembly illustrating the interior components of both the upper and lower enclosures and contents thereof and further illustrating the drawer-like lower enclosure in supporting relationship with the upper enclosure.
Figure 10:
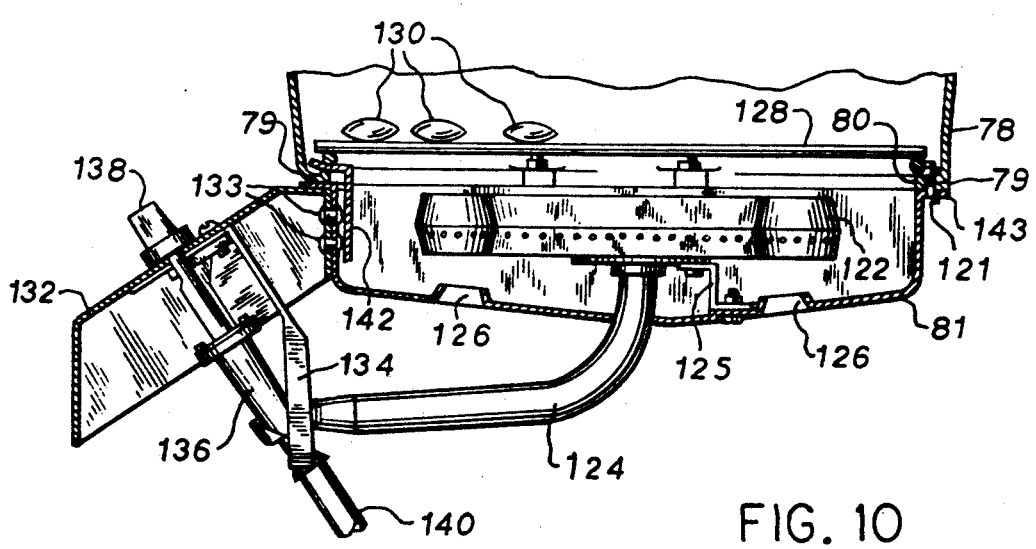

With reference to FIGS. 9 and 10, it will be observed that the lower enclosure or drawer 81 is slidably received by the lower wall 84 of the channel 82 rearwardly (FIG. 9) of the upper enclosure 78 to permit a longitudinal overlying L-shaped spring clip 142, to engage and rest upon the front marginal ledge 79 of the upper enclosure. When drawn forwardly on the slides 84, the rearward ledge 143 may be bolted in place by the bolts 12I (see FIG. 10) to enclose both the upper and lower enclosures 78, 81 to provide a unitary grill head assembly not unlike integrally, conventionally cast grill head containers, such as that disclosed in the aforementioned "Assembly Instruction & Parts List" (Stock No. 42681) mentioned hereinabove.

It will thus be apparent that by simply releasing the threaded bolts 121, the lower enclosure 81 may be removed from the upper enclosure 78 by merely moving it rearwardly for a slight distance to release the elongated clip 142 from the inner margin 79 and then outwardly away from the upper enclosure 78. The burner assembly 122 and the lower enclosure 81 may be readily cleaned and maintained by this arrangement. It is not necessary to remove any of the components of the upper assembly to have access to for cleaning and maintenance of the lower enclosure 81. An added feature in the form of a side burner 139 may be used in certain models of this grill assembly. The side burner 139 includes a pivoted cover 145 arranged to protect the burner (not shown) from the elements. The side burner 139 is supported from its stanchion 61 in a manner similar to the attachment of the workshelf 19, but is further reinforced (not shown) to provide additional lateral support and prevent collapsing.

I claim:

1. A barbecue grill comprising:
   a supporting base member;
   said base member including lever means comprising a pivot pin supported by said base member and a lever member supported by the pivot pin and having oppositely disposed lever moment arms,
   one of said moment arms arranged for retentive support of a fuel tank, and the oppositely disposed moment arm including a flexible, longitudinally movable indicator;
   wherein the said opposite moment arm has a downwardly facing channel shaped portion with depending apertured sidewalls, and wherein the movable indicator includes laterally extending portions pivotally supported by said apertured sidewalls and comprising a flexible strip include a cursor for displaying relative rotational movement of said opposite movement arm about the said pivot pin;
   biasing means normally biasing said lever means in a rotational direction about the pivot pin and opposing the weight of a fuel tank retained by said one of said lever movement arms;
   visual indicator means on said base member for observing relative movement of said movable indicator responsive to the weight of fuel contained in said fuel tank.

2. The barbecue grill as defined in claim 1, wherein the visual indicator means of the base member includes indexing indicia on an exposed surface of said base member and traversed by the said cursor to indicate relative weight of the fuel contained in said fuel tank.

3. A barbecue grill comprising:
   a supporting base member having an upper exposed surface, including an integrally formed, elongated trough having one end communicating with an integrally formed well, marginal defining walls of said well including oppositely disposed apertures;
   a pivot pin having its opposite ends disposed in the apertures of said well;
   an apertured fuel container clamping member arranged to receive said pivot pin, said clamping member terminating in a laterally extending tongue portion, said tongue portion projecting into and vertically movable within said elongated trough;
   a spring member arranged to bias said tongue portion outwardly of said trough responsive to the weight of a fuel container retained by said clamping member;
   an elongated flexible indicator strip slidably disposed in said trough and having one end secured to said tongue portion and including at its opposite end a cursor;,
   a transparent cover plate covering a portion of the trough and including indexing indicia identifying the extent of longitudinal movement of said indicator strip in said trough, whereby the extent of longitudinal movement of the cursor and flexible strip relative to the indexing indicia is indicative of the pivotal movement of said tongue portion relative to the weight of a fuel container retained by said pivoted clamping member.

4. A barbecue grill comprising:
   a base member including spaced apart re-entrant wells formed therein, said wells each being defined by an upstanding sidewall and a bottom wall, the said sidewall defining a recessed shoulder at its open marginal surface;
   upstanding stanchions each having a lower end portion seated within and supported by a respective well;
   fastening means for securing the stanchion to the base member; and
   a grill head assembly including a container having upstanding sidewalls, said container sidewalls being secured to the free ends of said stanchions.

5. The barbecue grill defined in claim 4, wherein the said stanchions each include an outwardly extending flange engageable with and supported by an upper exposed surface of said base member.

6. The barbecue grill defined in claim 5, wherein the re-entrant walls formed in the base member each include a recessed shoulder defined by the open marginal surface, and wherein the said stanchion flange is configured to rest upon and be supported by the said shoulder.

7. The barbecue grill defined in claim 5, wherein each stanchion includes an enclosed bottom surface engaging the bottom surface of its re-entrant well, and wherein both bottom surfaces are secured to one another.

8. A barbecue grill comprising:
   a stationary enclosure member having an open top and an open bottom defining a continuous sidewall;
   a cover alternatively removable to an open and closed position relative to the top opening;
   a stationary cooking grid and a substantially horizontal stationary briquett grate, each supported within the defining sidewall of the stationary enclosure member;
   a burner drawer supporting a burner member and having an enclosed bottom and an upstanding sidewall forming a cavity with a top opening, said drawer being slidably suspended below said stationary enclosure, and when in normally closed position, being operative to supply heat from said burner member to said briquette grate and to said cooking grid positioned thereabove, and further, said burner drawer being slidably movable in a relatively horizontal plane to permit substantial opening and closure of the open bottom of the stationary enclosure member for ready access to the burner member.

9. The barbecue grill defined in claim 8, wherein said stationary enclosure member is supported by spaced apart upright stanchions, and wherein said stanchions each include an inwardly extending stationary drawer slide member for slidably supporting said burner drawer.

10. The barbecue grill defined in claim 9, wherein said stationary enclosure member and said burner drawer, when closed, are retained in relative alignment by means of releasable fasteners.

11. A barbecue grill comprising:
    a stationary enclosure member having an open top and an open bottom defining a continuous sidewall;

a cover alternatively removable to an open and closed position relative to the top opening;

a stationary cooking grid and a substantially horizontal stationary briquett grate, each supported within the defining sidewall of the stationary enclosure member;

a burner drawer supporting a burner member and having an enclosed bottom and an upstanding sidewall forming a cavity with a top opening, said drawer being slidably suspended below said stationery enclosure, and when in normally closed position, being operative to supply heat from said burner member to said briquette grate and to said cooking grid positioned thereabove, and further, said burner drawer being slidably movable in a relatively horizontal plane to permit substantial opening and closure of the open bottom of the stationary enclosure member for ready access to the burner member;

a stationary slide member; and wherein the said slide member is of general channel-shape having bifurcated upper and lower elongated legs lying in a substantially horizontal plane and joined by an intermediate bail portion, the bail portion being secured to the inner face of a respective stanchion, the upper one of said channel legs supporting said stationary enclosure member and the lower channel leg arranged to slidably receive and support said burner drawer.

12. A barbecue grill supported by an upright stanchion and comprising:

a laterally extending workshelf;

means for collapsible pivotable support fo said workshelf in a substantially horizontal plane relative to said upright stanchion and releasable means for alternative horizontal support and collapse of said workshelf;

said workshelf including a first integrally formed well;

utility board means arranged for removable seating in said well;

integrally formed, hook-like support members laterally projecting from said workshelf; and at leastone integrally formed container well in said workshelf and spaced from said first well for supporting a container-like object; and wherein said workshelf comprises a hollow, substantially continuous plastic molding and said wells are each integrally formed therein.

* * * * *